US009996082B2

(12) United States Patent
Glatfelter et al.

(10) Patent No.: US 9,996,082 B2
(45) Date of Patent: Jun. 12, 2018

(54) AUTONOMOUS VEHICLE RE-TASKING DURING PERFORMANCE OF A PROGRAMMED TASK BASED ON DETECTION OF A TASK INTERRUPTION SCENARIO

(71) Applicant: The Boeing Company, Chicago, IL (US)

(72) Inventors: John W. Glatfelter, Chicago, IL (US); Brian Dale Laughlin, Chicago, IL (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 15/181,597

(22) Filed: Jun. 14, 2016

(65) Prior Publication Data

US 2017/0357263 A1 Dec. 14, 2017

(51) Int. Cl.
| | |
|---|---|
| *B64D 47/08* | (2006.01) |
| *G05D 1/02* | (2006.01) |
| *G05D 1/10* | (2006.01) |
| *G06K 9/00* | (2006.01) |
| *G06K 9/62* | (2006.01) |
| *H04N 5/33* | (2006.01) |
| *H04N 7/18* | (2006.01) |
| *B64C 39/02* | (2006.01) |

(52) U.S. Cl.
CPC ......... *G05D 1/0212* (2013.01); *B64C 39/024* (2013.01); *B64D 47/08* (2013.01); *G05D 1/0246* (2013.01); *G05D 1/101* (2013.01); *G06K 9/0063* (2013.01); *G06K 9/6215* (2013.01); *H04N 7/18* (2013.01)

(58) Field of Classification Search
CPC .... G05D 1/0212; G05D 1/0246; G05D 1/101; B64D 47/08; G06K 9/0063; G06K 9/6215; H04N 5/33; H04N 7/181
USPC .......................................................... 701/26
See application file for complete search history.

(56) References Cited

U.S. PATENT DOCUMENTS

| | | | |
|---|---|---|---|
| 9,639,960 B1* | 5/2017 | Loveland | ................ G06T 7/602 |
| 2010/0282897 A1* | 11/2010 | de la Torre | ........... B64C 39/024 244/49 |
| 2014/0163772 A1* | 6/2014 | Vian | .................... G05D 1/0094 701/2 |

(Continued)

*Primary Examiner* — Yazan Soofi
(74) *Attorney, Agent, or Firm* — McDonnell Boehnen Hulbert & Berghoff LLP (57) ABSTRACT

An example autonomous vehicle includes a communication interface for receiving instructions to perform a first task in an environment using a first strategy, sensors for detecting conditions in the environment to carry out the first task, data storage storing a plurality of task interruption scenarios each having an associated priority setting, and a processor for executing instructions for autonomous decision-making to perform functions. The functions include during performance of the first task, identifying that the conditions in the environment are associated with one of the plurality of task interruption scenarios, determining that the identified task interruption scenario is associated with a second task that has a higher priority setting than the first task, determining an asset needed to perform the second task, and based on the autonomous vehicle having the asset, autonomously (i) stopping performance of the first task and (ii) changing to perform the second task.

24 Claims, 5 Drawing Sheets

(56) References Cited

U.S. PATENT DOCUMENTS

| | | | |
|---|---|---|---|
| 2014/0180914 A1* | 6/2014 | Abhyanker | G01C 1/00 |
| | | | 705/39 |
| 2015/0266576 A1* | 9/2015 | Hobbart | B64C 39/024 |
| | | | 244/2 |
| 2016/0304198 A1* | 10/2016 | Jourdan | B64C 39/024 |
| 2017/0021941 A1* | 1/2017 | Fisher | B64C 39/024 |
| 2017/0090484 A1* | 3/2017 | Obaidi | G05D 1/104 |

* cited by examiner

AUTONOMOUS VEHICLE RE-TASKING DURING PERFORMANCE OF A PROGRAMMED TASK BASED ON DETECTION OF A TASK INTERRUPTION SCENARIO

FIELD

The present disclosure generally relates to autonomous vehicle operation, and more particularly to autonomous vehicle re-tasking during performance of a programmed task based on detection of a task interruption scenario associated conditions detected in an environment.

BACKGROUND

Search and rescue (SAR) is a search for and provision of aid to people who are in distress or danger so as to enhance their safety. A general field of search and rescue includes many specialty sub-fields, typically determined by a type of terrain over which the search is conducted. These include mountain rescue, ground search and rescue (including the use of search and rescue dogs), urban search and rescue in cities, and combat search and rescue on a battlefield and air-sea rescue over water.

Autonomous vehicles are often used during search and rescue operations. The autonomous vehicles are pre-programmed to search an area using a specific pattern and strategy. Once complete, the autonomous vehicle(s) return to a base of operation, receive new programming instructions, and either explore the same area using a different pattern and strategy or explore a new area. Reprogramming of the autonomous vehicles can negatively impact safety of individuals involved in the situation because as the vehicle returns to the base to receive new instructions, valuable search time is lost.

What is needed is a way to re-task the autonomous vehicle for the purpose of decreasing handoffs and increasing search and rescue operations, thereby increasing safety of the victims by decreasing downtime events.

SUMMARY

In one example, an autonomous vehicle is described that comprises a communication interface for receiving instructions to perform a first task in an environment using a first strategy and the first task has a priority setting, one or more sensors for detecting one or more conditions in the environment to carry out the first task using the first strategy, data storage storing a plurality of task interruption scenarios each having an associated priority setting and storing executable instructions for autonomous decision-making, and one or more processors for executing the instructions for autonomous decision-making stored in the data storage to perform functions. The functions comprise during performance of the first task, identifying that the one or more conditions in the environment detected by the one or more sensors is associated with one of the plurality of task interruption scenarios, determining that the identified task interruption scenario is associated with a second task that has a higher priority setting than the first task, determining one or more assets needed to perform the second task, and based on the autonomous vehicle having the one or more assets needed to perform the second task, autonomously (i) stopping performance of the first task and (ii) changing to perform the second task in the environment.

In another example, a method for autonomous re-tasking of an autonomous vehicle is described that comprises receiving instructions, at an autonomous vehicle, to perform a first task in an environment using a first strategy and using one or more sensors of the autonomous vehicle to carry out the first task using the first strategy, and the first task has a priority setting. The method also comprises during performance of the first task, the autonomous vehicle identifying a condition in the environment being associated with a task interruption scenario, based on outputs from the one or more sensors. The method also comprises determining, by the autonomous vehicle, that the task interruption scenario is associated with a second task that has a higher priority setting than the first task, determining, by the autonomous vehicle, one or more assets needed to perform the second task, and based on the autonomous vehicle having the one or more assets needed to perform the second task, the autonomous vehicle autonomously (i) stopping performance of the first task and (ii) changing to perform the second task in the environment.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Search and rescue processes can be complex and challenging due to weather, environment, terrain, etc. Autonomous vehicles (e.g., un-manned aerial vehicles, drones, etc.) can be used to assist with the processes. Generally, an autonomous vehicle can be deployed based on any number of factors including an event notification, a time of day, a weather condition, and other trigger events.

The autonomous vehicle typically includes a mission profile or task to perform, along with a task strategy. An example task may be to travel to an accident investigation field and search for people in need of aid, and an example task strategy may be to traverse the accident investigation field in a zig-zag pattern. While performing the task, the autonomous vehicle collects data in the environment using sensors, and if any of the data is indicative of an interruption scenario, the autonomous vehicle includes autonomous decision-making processes onboard to re-task itself with a new task or new task strategy.

The autonomous vehicle thus can re-task itself to decrease handoffs to other vehicles and increase search and rescue operations, thereby increasing safety of the victims. As an example, if during performance of the task, the autonomous vehicle detects an object or item of higher value or higher priority than the initial task, then the autonomous vehicle is programmed to resolve the potential conflict and determine an appropriate action to take. This results in time savings by eliminating return, reprogram, and redeployment of the autonomous vehicle.

Figure 1:
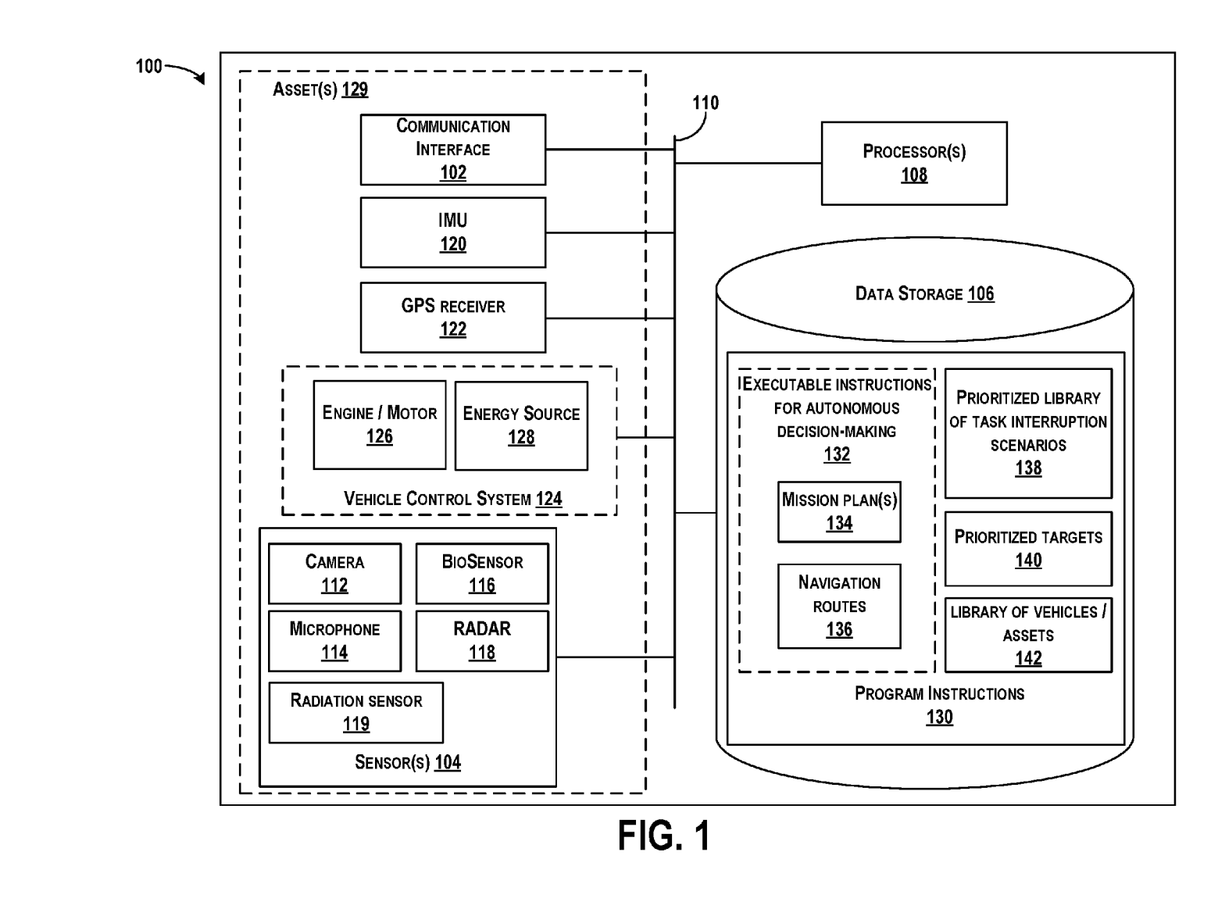
FIG. 1 illustrates an example autonomous vehicle is illustrated, according to an example embodiment.

Referring now to FIG. 1, an example autonomous vehicle 100 is illustrated, according to an example embodiment. The autonomous vehicle 100 includes a communication interface 102, sensor(s) 104, data storage 106, and one or more processor(s) 108 each connected to a communication bus 110.

The autonomous vehicle 100 may take the form of many different types of vehicles including an aerial vehicle, an un-manned aerial vehicle (UAV), a drone, a helicopter device, a multicopter, an autonomous driven vehicle, a land vehicle, a water vehicle, a water submersible vehicle, among other possibilities.

The communication interface 102 may be a wireless interface and/or one or more wireline interfaces that allow for both short-range communication and long-range communication to one or more networks or to one or more remote devices. Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

The sensors 104 include any number or type of sensors including a camera 112, a microphone 114, a biosensor 116, and a RADAR 118, and a radiation sensor 119. The sensors 104 allow the autonomous vehicle 100 to sense objects in the environment. As one example, the microphone 114 includes an auditory-sensor to identify an auditory signature or auditory level in the environment. As another example, the RADAR 118 can determine a distance to an object or, sense the presence of, and/or determine the distance to the object. The RADAR 118 can also include a light detection and ranging (LIDAR) system, laser detection and ranging (LADAR) system, and/or an infrared or forward-looking infrared (FLIR) system, among other possibilities. The radiation sensor 119 can detect or identify a radiation level in the atmosphere or environment, for example.

The camera 112 can include an imaging system, such as a video camera, to capture image data from the environment. As a specific example, charge-coupled device (CCD) cameras or complementary metal-oxide-semiconductor (CMOS) cameras can be used, among other possibilities. Thus, the camera 112 can include a visual camera. The camera 112 can also include a night-vision camera and/or a forward looking infrared radar device or an infrared camera. The camera 112 may capture imagery of the environment and compare the imagery to what is expected given a current estimated position to help with navigation.

The microphone 114 may be configured to capture sound from the environment.

The biosensor 116 (or biological sensor) includes a transducer and a biological element that may be an enzyme, an antibody or a nucleic acid that interacts with an analyte being tested and a biological response is converted into an electrical signal by the transducer. The biosensor 116 may detect certain chemicals in the environment, for example. The biosensor 116 may also take the form of a temperature sensor as well.

The autonomous vehicle 100 is shown to include additional components including an inertial measurement unit (IMU) 120 that can include both an accelerometer and a gyroscope, which may be used together to determine an orientation of the autonomous vehicle 100. In particular, the accelerometer can measure the orientation of the autonomous vehicle 100 with respect to earth, while the gyroscope measures the rate of rotation around an axis. The IMU 120 may take the form of or include a miniaturized MicroElectroMechanical System (MEMS) or a NanoElectroMechanical System (NEMS). Other types of IMUs may also be utilized. The IMU 120 may include other sensors, in addition to accelerometers and gyroscopes, which may help to better determine position and/or help to increase autonomy of the autonomous vehicle 100. Two examples of such sensors are magnetometers and pressure sensors (or barometer), which may be used to determine the altitude of the autonomous vehicle 100.

The autonomous vehicle 100 also includes a global position system (GPS) receiver 122 configured to provide data that is typical of well-known GPS systems, such as the GPS coordinates of the autonomous vehicle 100. Such GPS data may be utilized by the autonomous vehicle 100 for various functions, such as to navigate to a target position.

The autonomous vehicle 100 also includes a vehicle control system 124 including an engine/motor 126 and an energy source 128. Depending on the form of the autonomous vehicle 100, various engines and energy sources can be used. An example energy source 128 can include fuel or batteries for providing power to the autonomous vehicle 100. The engine/motor 126 can be a combustion engine or an electric engine to name a few examples.

The various components of the autonomous vehicle 100 including the communication interface 102, the sensor(s) 104, the IMU 120, the GPS receiver 122, the vehicle control system 124, among others may be referred to as assets 129 of the autonomous vehicle 100 that provide the autonomous vehicle 100 with capabilities to perform certain tasks. Various autonomous vehicles can have a different combination of assets depending on a configuration and use of the autonomous vehicles.

The processor(s) 108 may be a general-purpose processor or a special purpose processor (e.g., digital signal processors, application specific integrated circuits, etc.). The processor(s) 108 can be configured to execute program instructions 130 (e.g., computer-readable program instructions) that are stored in the data storage 106 and are executable to provide the functionality of the autonomous vehicle 100 described herein.

The data storage 106 may include or take the form of one or more computer-readable storage media that can be read or accessed by the processor(s) 108. The computer-readable storage media can include volatile and/or non-volatile storage components, such as optical, magnetic, organic or other memory or disc storage, which can be integrated in whole or in part with the processor(s) 108. The data storage 106 is considered non-transitory computer readable media. In some embodiments, the data storage 106 can be implemented using a single physical device (e.g., one optical, magnetic, organic or other memory or disc storage unit), while in other embodiments, the data storage 106 can be implemented using two or more physical devices.

The data storage 106 also stores executable instructions for autonomous decision-making 132. Example instructions for autonomous decision-making 132 can include an artificial intelligence or machine learning functionality to discern and make decisions based on information received from the sensor(s) 104. The instructions for autonomous decision-making 132 can include step-by-step functions to be executed to identify objects in the environment, determine categories and relationships between the objects, and to determine situations, events, states and time of the relationships resulting in predicted causes and effects.

In addition, other example instructions for autonomous decision-making 132 include predetermined mission plan(s) 134. The mission plan(s) 134 may include specific instructions to travel to a specific area (e.g., noted by geographic coordinates) taking a specific route or to perform a specific objective in an area. In this manner, the example instructions for autonomous decision-making 132 also include navigation routes 136 that instruct how to travel to the specific area.

Example navigation routes 136 can be determined with use of the GPS receiver 122 to provide functionality that allows the autonomous vehicle 100 to move about in its environment and reach a desired location. The autonomous vehicle 100 may implement various navigation techniques, such as map-based navigation and localization-based navigation, for example. With map-based navigation, the navigation routes 136 may provide a map of the environment that can then be used by the autonomous vehicle 100 to navigate to a particular location on the map. With localization-based navigation, the autonomous vehicle 100 may be capable of navigating in an unknown environment using localization. Localization-based navigation may involve the autonomous vehicle 100 building its own map of its environment and calculating its position within the map and/or the position of objects in the environment. For example, as the autonomous vehicle 100 moves throughout its environment, the autonomous vehicle 100 may continuously use localization to update its map of the environment. This continuous mapping process is referred to as simultaneous localization and mapping (SLAM). Other navigation techniques may also be utilized.

In addition, the autonomous vehicle 100 can use various types of location-determination techniques to accomplish localization of an object or target. For example, the autonomous vehicle 100 can use the sensor(s) 104 including the camera 112 or microphone 114 to obtain additional inputs that the processor(s) 108 utilize to navigate autonomously or semi-autonomously to the identify the target.

The data storage 106 also stores a prioritized library of task interruption scenarios 138. In examples, the prioritized library of task interruption scenarios 138 are part of the executable instructions for autonomous decision-making 132. The prioritized library of task interruption scenarios 138 includes listings of conditions, targets, and/or objects with associated priorities for detection. Thus, each of the task interruption scenarios has an associated priority setting. The communication interface 102 of the autonomous vehicle 100 receives instructions to perform a first task (e.g., one of the mission plans 134) in an environment using a first strategy (e.g., following one of the navigation routes 136). The first task is assigned a priority setting. Various priority settings are possible including low, medium, and high, for example. The priority setting is useful for comparison with other priority settings of other tasks.

The sensor(s) 104 then detect conditions in the environment to carry out the first task using the first strategy. The processor(s) 108 execute the instructions for autonomous decision-making 132 stored in the data storage 106 to perform the first task, as well as to perform additional functions. For example, the processor(s) 108 execute the instructions for autonomous decision-making 132 to identify, during performance of the first task, that the conditions in the environment detected by the sensor(s) 104 are associated with one of the plurality of task interruption scenarios stored in the prioritized library of task interruption scenarios 138. The processor(s) 108 then determine whether the identified task interruption scenario is associated with a second task that has a higher priority setting than the first task, and determine any assets that may be needed to perform the second task. When the processor(s) 108 determine that identified task interruption scenario is associated with a second task that has a higher priority setting than the first task, and that the autonomous vehicle 100 has the assets 129 needed to perform the second task, the processor(s) 108 autonomously (i) stop performance of the first task and (ii) change to perform the second task in the environment.

Thus, within examples, the autonomous vehicle 100 can perform a first task identified as one of the mission plans 134, but while performing the first task, if the autonomous vehicle 100 identifies some condition in the environment that is associated with one of the plurality of task interruption scenarios stored in the prioritized library of task interruption scenarios 138 that has a higher priority than the first task, the autonomous vehicle 100 can change to perform actions that resolve the task interruption scenario.

The prioritized library of task interruption scenarios 138 can be arranged as a table listing conditions in the environment associated a task interruption scenario, and the task interruption scenario is associated with a task that has an assigned priority. An example table is shown below.

| Conditions | Task Interruption Scenario | Task | Priority |
|---|---|---|---|
| Temperature > threshold Camera detects thermal image | Possible fire identified | Search for people | High |
| Chemicals in air > threshold | Possible dangerous substance spill | Search for damaged vehicle/overturned truck | High |
| Camera image analysis identifies vehicles in close proximity RADAR shows vehicle wreckage | Possible vehicle accident | Search for people | Medium |
| Camera image analysis identifies vehicles in close proximity | Possible vehicle accident | Search roadways for vehicle accident | Low |

The table may further include a column identifying assets needed to perform the task, for example, cameras, biosensors, etc.

The prioritized library of task interruption scenarios 138 can be manually created and stored in the data storage 106 on the autonomous vehicle 100. Any number of scenarios may be generated to describe possible situations and conditions that the autonomous vehicle 100 may identify during performance of tasks. This enables the autonomous vehicle 100 to perform the first task that has some objective (e.g., search for an identified vehicle in a combat zone), but if the autonomous vehicle 100 detects conditions in the environment matching a task interruption scenario associated with a task that has a higher priority (e.g., small arms fire or mobile launcher identified), because this new task has a higher priority than the autonomous vehicle 100 can change in real time to address the new task.

Within examples, the autonomous vehicle 100 may be programmed to perform the first task, but identifies something in the environment associated with a second task of higher priority, and thus, the autonomous vehicle 100 changes to perform the second task. The autonomous vehicle 100 may not return to complete the first task, or may do so at a later time.

The prioritized library of task interruption scenarios 138 can be arranged as patterns of escalating concerns. The processor(s) 100 execute the instructions for autonomous decision-making 132 stored in the data storage 106 to identify priority settings associated with the identified task interruption scenario. The priority settings can be included in the table as shown above.

The processor(s) 108 also execute the instructions for autonomous decision-making 132 stored in the data storage 108 to perform functions in real-time during performance of the first task. These actions can then occur with no delay to process additional data received from other sources or through manual input. The real time processing means that the processor(s) perform the actions of changing to perform the second higher priority task during performance of the first task. The real time processing may continually process outputs of the sensor(s) 104 to determine whether any output is indicative of a condition associated with one of the interruption scenarios. Put another way, the real time aspect includes the autonomous vehicle 100 deciding to change to perform the second higher priority task substantially immediately upon detecting the conditions associated with an identified interruption scenario. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Thus, within examples herein, the autonomous vehicle 100 can re-task itself in real-time, and make decisions to discontinue performance of a programmed first task when a higher priority item is identified. This enables the autonomous vehicle 100 to deviate from the programmed first task based on items, objects, or conditions detected in the environment. The autonomous vehicle 100 is programmed to follow instructions of a first task, but has a logic structure to ascertain what to do in event that unexpected conditions are detected.

The data storage 106 further stores a listing of prioritized targets 140, and a library of vehicles and associated assets 142.

The listing of prioritized targets 140 can identify objects and have assigned priorities to those objects. In this manner, the first task may be associated with a search for a first target having a priority setting, and the processor(s) 108 execute the instructions for autonomous decision-making 132 to determine whether any detected conditions in the environment include one of the prioritized targets 140, which may cause the autonomous vehicle 100 to change tasks. The processor(s) 108 then determine whether the identified target has a higher priority setting than the first task to determine whether to change tasks. The processor(s) may process images captured by the camera 112 to identify one of the stored prioritized targets 140 in the environment. In other examples, the processor(s) process outputs of the biosensor 116 to identify a biological or chemical substance that is associated with one of the stored prioritized targets 140. In still further examples, the processor(s) process outputs of the radiation-sensor 119 to identify a radiation level associated with one of the stored prioritized targets 140. In still further examples, the processor(s) process outputs of the microphone 114 (or other auditory-sensor) to identify an auditory signature or level associated with one of the stored prioritized targets 140.

Figure 2:
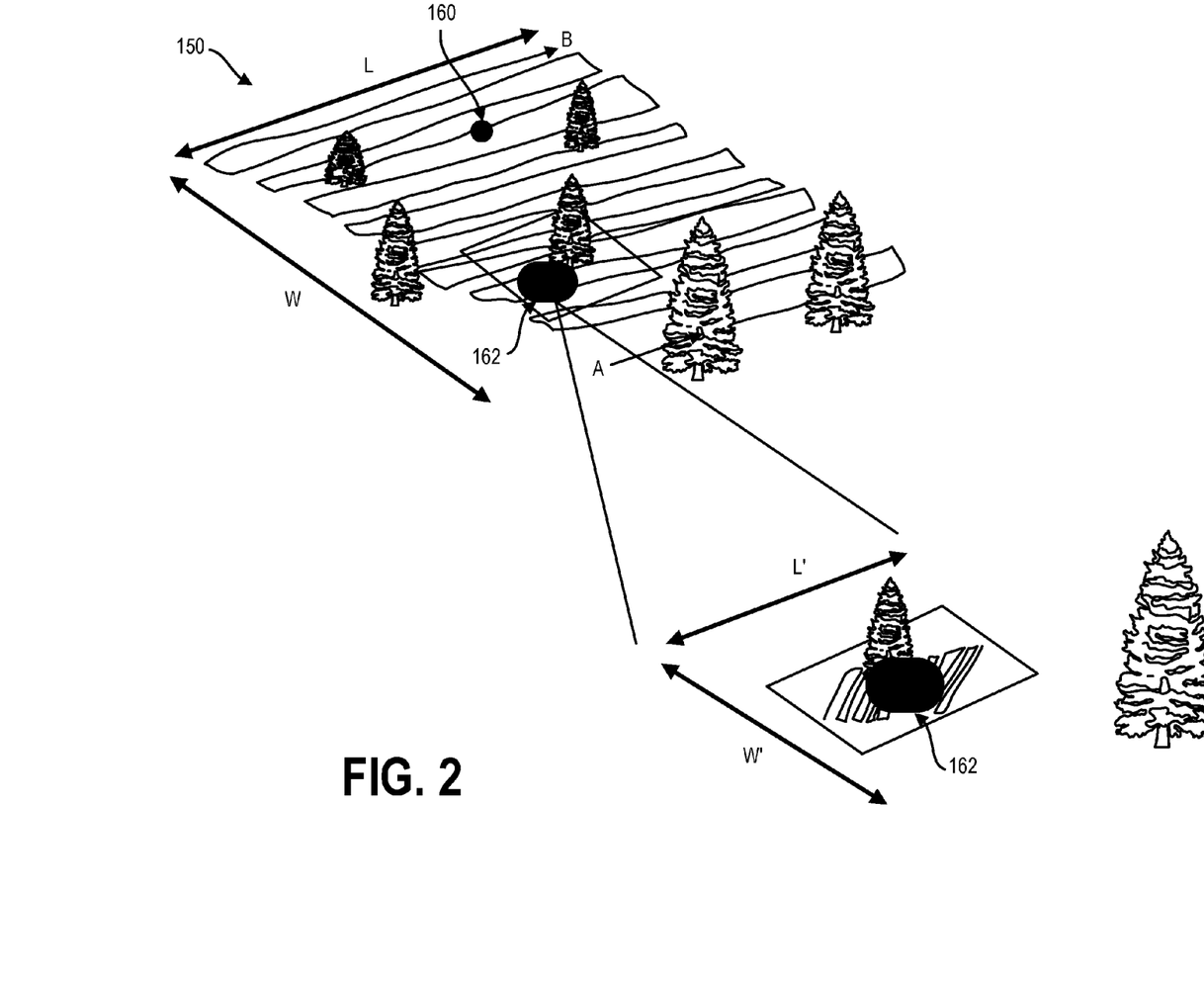
FIG. 2 illustrates an example environment and an example task for performance by the autonomous vehicle.

FIG. 2 illustrates an example environment 150 and an example task for performance by the autonomous vehicle 100. The task may include searching for an object or a target 160 using a search strategy having a pattern shown by the arrows starting at location A and ending at location B. While traversing the pattern and performing the task, the autonomous vehicle 100 may detect a second target 162 via images from the camera 112. The processor(s) 108 process the camera images and identify that the images are associated with one of the plurality of task interruption scenarios stored in the prioritized library of task interruption scenarios 138.

The processor(s) 108 further determine that the identified task interruption scenario is associated with a second task that has a higher priority setting than the first task, and that the autonomous vehicle 100 includes assets needed to perform the second task. Thus, the autonomous vehicle 100 autonomously stops performance of the first task and changes to perform the second task in the environment 150 which includes changing to search the highlighted area for aspects associated with the second target 162, as shown in the zoomed in view in FIG. 2. Thus, through real-time discovery of a target via outputs of the camera 112, the autonomous vehicle 100 retasks itself.

Figure 3:
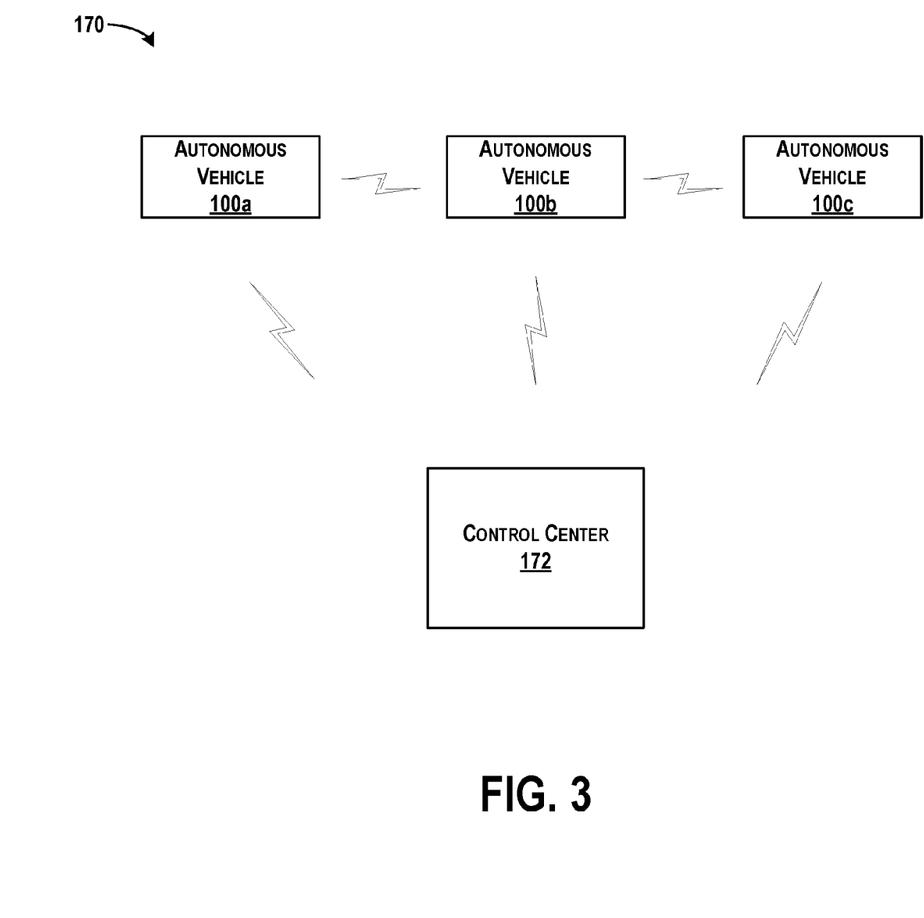
FIG. 3 illustrates an example system including multiple autonomous vehicles.

FIG. 3 illustrates an example system 170 including multiple autonomous vehicles 100a-c. The system 170 further includes a control center 172. The autonomous vehicles 100a-c each have a communication interface 102 enabling the autonomous vehicles 100a-c to communicate wirelessly with each other, and as well to communicate wirelessly with the control center 172. In instances in which a second higher priority task is found and the autonomous vehicle 100a does not have the assets needed to perform the second task, the processor(s) execute the instructions for autonomous decision-making 132 to send, via the communication interface 102, a notification to the control center 172 informing of the identified condition. In this example, the control center 172 can notify one of the autonomous vehicles 100b-c that has necessary assets to perform the second task.

In other examples, the processor(s) 108 execute the instructions for autonomous decision-making 132 to assign, via the communication interface 102, performance of the second task to another autonomous vehicle 100b that has the one or more assets needed to perform the second task. The autonomous vehicle 100 can access the library of vehicles and associated assets 142 to determine which autonomous vehicle to assign the task.

In still further examples, the processor(s) can execute the instructions for autonomous decision-making 132 to reassign, via the communication interface 102, performance of the first task to another autonomous vehicle 100c that has one or more assets needed to perform the first task when the autonomous vehicle 100a changes to perform the second task.

Figure 4:
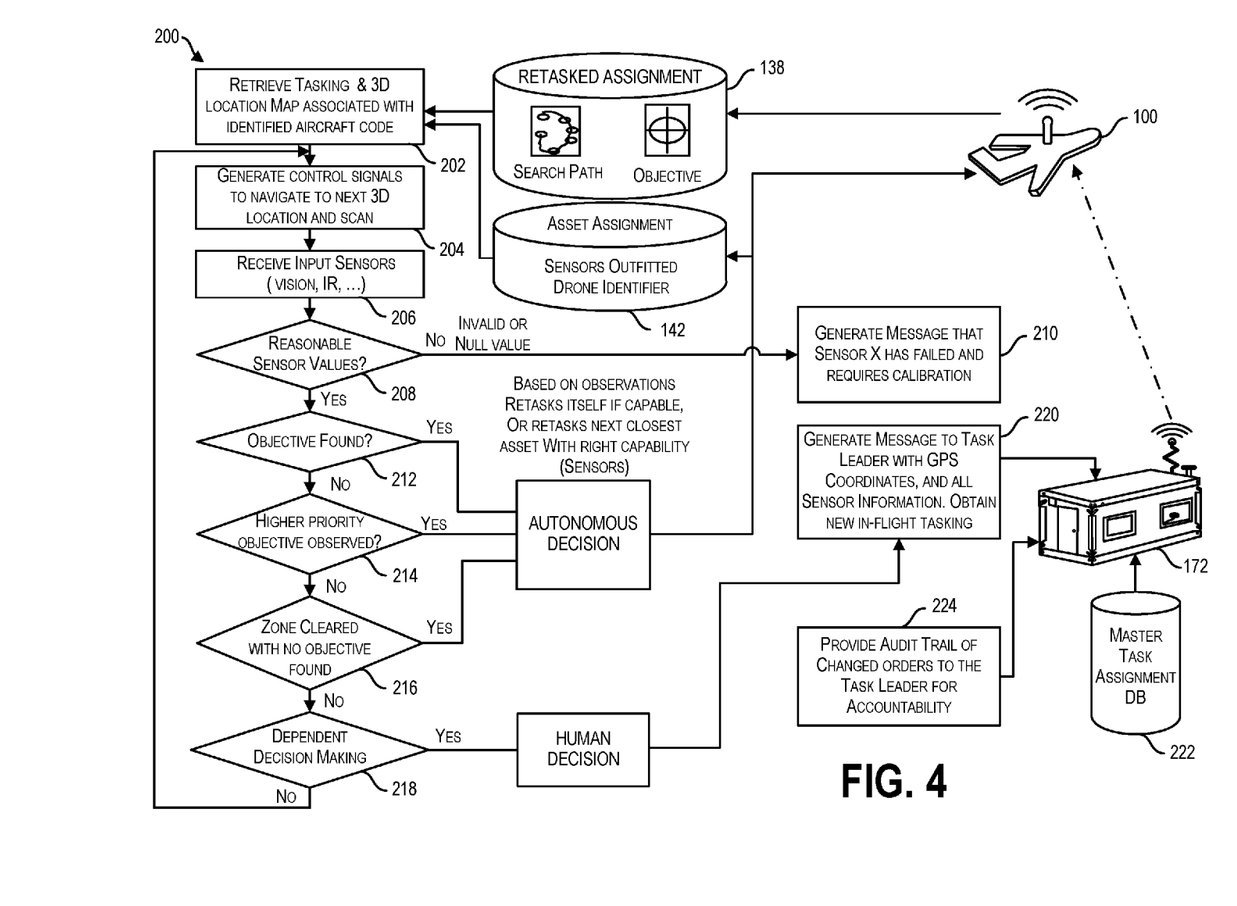
FIG. 4 shows a flowchart of an example method for autonomous re-tasking of an autonomous vehicle, according to an example embodiment.

FIG. 4 shows a flowchart of an example method 200 for autonomous re-tasking of an autonomous vehicle, according to an example embodiment. Method 200 shown in FIG. 4 presents an embodiment of a method that, for example, could be used with the autonomous vehicle 100 shown in FIG. 1 and the system 170 shown in FIG. 3, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At shown at block 202, initially the autonomous vehicle 100 retrieves tasking and a three-dimensional (3D) location map associated with an identified aircraft code for performing a first programmed task. As shown at block 204, the autonomous vehicle 100 generates control signals to navigate to the next 3D location and to scan the environment with the sensor(s) 104. As shown at block 206, the autonomous vehicle 100 receives inputs from the sensor(s) 104 (e.g., vision sensors, infrared (IR) sensors). As shown at block 208, the autonomous vehicle 100 processes the sensor inputs to determine whether the sensor values are reasonable or due to noise. If not reasonable, invalid, or null, the autonomous vehicle 100 generates a message that sensor "X" has failed or requires calibration, as shown at block 210.

As shown at block 212, the autonomous vehicle 100 will process reasonable sensor values to determine if an objective of the task has been found. If so, the autonomous vehicle 100 performs autonomous decision-making to determine whether to retask itself by reference to the prioritized library of task interruption scenarios 138, or to retask next closets vehicle with appropriate assets by reference to the library of vehicles/assets 142. As shown at block 214, the autonomous vehicle 100 determines if a higher priority objective is observed as a basis to perform autonomous decision-making to determine whether to retask itself. Additionally, as shown at block 216, the autonomous vehicle 100 further determines if a zone is cleared with no objective found as a basis to perform autonomous decision-making to determine whether to retask itself.

Following, as shown at block 218, dependent decision making by a human operator can be performed once other functions are exhausted, and as shown at block 220, a message can be generated to a task leader at the control center 172 indicating GPS coordinates, and all outputs of the sensor(s) 104 to log the task performance, and then a new in-flight tasking can be obtained by reference to a master task assignment database 222. The task leader can generate and provide an audit trail of changed orders as well, as shown at block 224.

Within examples, performing the method 200 adds autonomous decision-making first, based on observations of the autonomous vehicle 100, to retask itself if capable, and then fall back on human operator decision making if needed. This enables the autonomous vehicle 100 to avoid returning to the control center 172 for a task leader to reprogram a new task. The autonomous vehicle has the ability to identify a new high value target and to pull in assets needed to address the new target. A result of the autonomous decision-making by the autonomous vehicle 100 includes identifying that additional assets or additional/different autonomous vehicles are needed to address the identified situation.

Figures 5, 6, 7, 8:
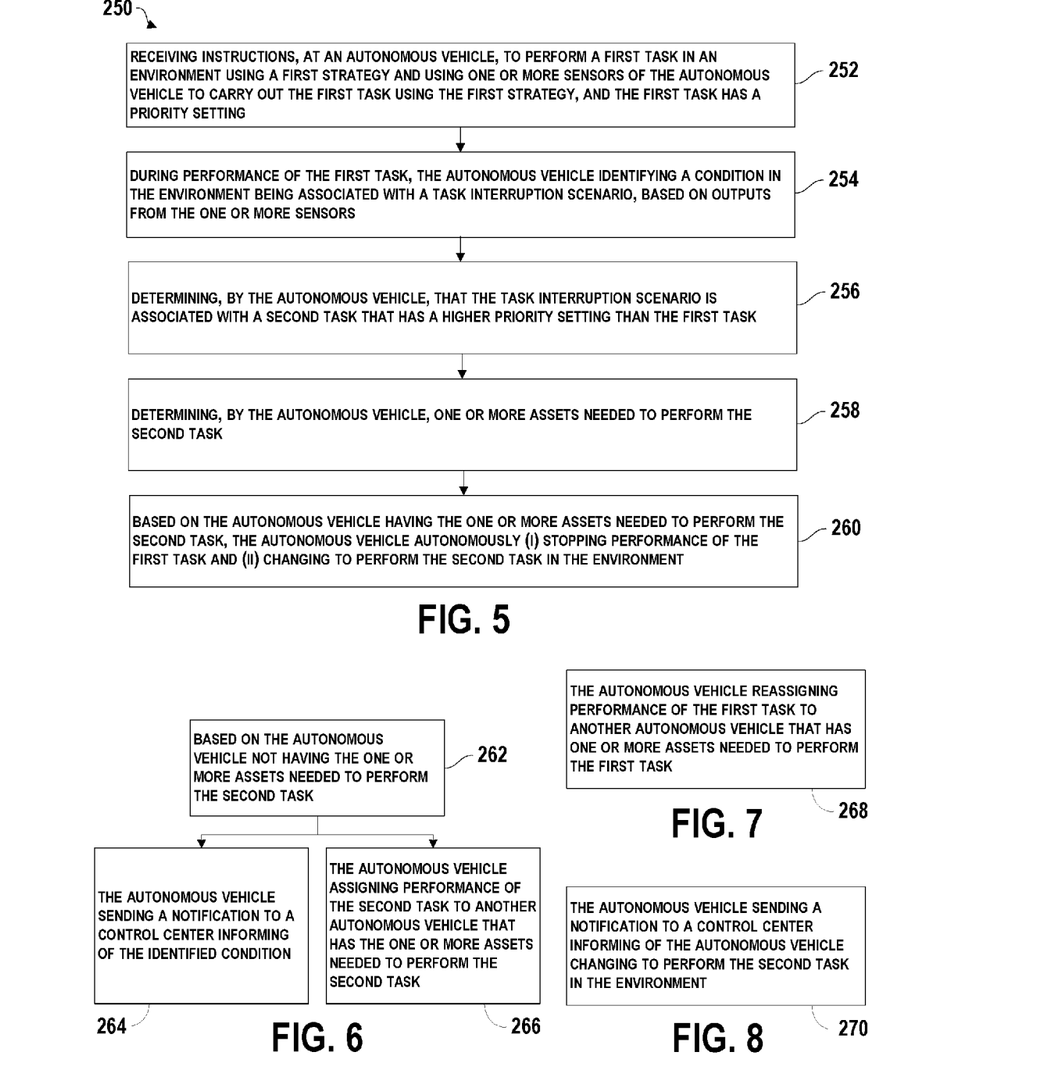
FIG. 5 shows another flowchart of an example method for autonomous re-tasking of an autonomous vehicle, according to an example embodiment.
FIG. 6 shows a flowchart of an example method for use with the method of FIG. 5, according to an example embodiment.
FIG. 7 shows a flowchart of an example method for use with the method of FIG. 5, according to an example embodiment.
FIG. 8 shows a flowchart of an example method for use with the method of FIG. 5, according to an example embodiment.

FIG. 5 shows another flowchart of an example method 250 for autonomous re-tasking of an autonomous vehicle, according to an example embodiment. Method 250 shown in FIG. 5 presents an embodiment of a method that, for example, could be used with the autonomous vehicle 100 shown in FIG. 1 and the system 170 shown in FIG. 3, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 252, the method 250 includes receiving instructions, at the autonomous vehicle 100, to perform a first task in an environment using a first strategy and using one or more sensors 104 of the autonomous vehicle 100 to carry out the first task using the first strategy. The first task has a priority setting. Within examples, the first task includes searching the environment for a target, and the first strategy includes a search pattern.

At block 254, the method 250 includes during performance of the first task, the autonomous vehicle 100 identifying a condition in the environment being associated with a task interruption scenario (e.g., as stored in the prioritized library of task interruption scenarios 138), based on outputs from the one or more sensors 104. Within examples, the autonomous vehicle 100 includes the processor(s) 108 and the data storage 106 storing the plurality of task interruption scenarios in the prioritized library of task interruption scenarios 138 and each has an associated priority setting.

At block 256, the method 250 includes determining, by the autonomous vehicle 100, that the task interruption scenario is associated with a second task that has a higher priority setting than the first task. Within examples, the processor(s) access the data storage 106 to identify the priority setting associated with the task interruption scenario to determine that the task interruption scenario is associated with the second task that has the higher priority setting than the first task.

Within other examples the data storage 106 stores prioritized targets 140, and the processor(s) 108 access the data storage 106 to determine that the condition in the environment includes one of the prioritized targets 140. The processor(s) 108 then determine that the one of the prioritized targets 140 has the higher priority setting than the first task as a basis to change to perform the second task. Within further examples, the processor(s) 108 process images or video streaming imagery captured by the camera 112 to identify one of the stored prioritized targets 140. Within still other examples, the processor(s) 108 process outputs of the biosensor 116 to identify a chemical substance associated with one of the stored prioritized targets 140.

At block 258, the method 250 includes determining, by the autonomous vehicle 100, one or more assets needed to perform the second task.

At block 260, the method 250 includes based on the autonomous vehicle 100 having the one or more assets needed to perform the second task, the autonomous vehicle 100 autonomously (i) stopping performance of the first task and (ii) changing to perform the second task in the environment. Within examples, the autonomous vehicle 100 autonomously (i) stopping performance of the first task and (ii) changing to perform the second task in the environment occurs in real-time during performance of the first task.

FIG. 6 shows a flowchart of an example method for use with the method 250, according to an example embodiment. At block 262, functions include based on the autonomous vehicle 100 not having the one or more assets needed to perform the second task, either the autonomous vehicle 100 sending a notification to the control center 172 informing of the identified condition, as shown at block 264, or the autonomous vehicle 100 assigning performance of the second task to another autonomous vehicle 100b-c that has the one or more assets needed to perform the second task, as shown at block 266.

FIG. 7 shows a flowchart of an example method for use with the method 250, according to an example embodiment. At block 268, functions include the autonomous vehicle 100 reassigning performance of the first task to another autonomous vehicle 100b-c that has one or more assets needed to perform the first task.

FIG. 8 shows a flowchart of an example method for use with the method 250, according to an example embodiment. At block 270, functions include the autonomous vehicle 100 sending a notification to the control center 172 informing of the autonomous vehicle 100 changing to perform the second task in the environment.

Examples methods and systems described herein optimize utilization of autonomous vehicles, and provide safety benefits including assistance to search and rescue operations such as National Guard, federal aviation administration (FAA), national transportation safety board (NTSB), Police, emergency medical technician (EMT). By enabling the autonomous vehicle 100 to retask itself, much time is saved by avoiding requiring the autonomous vehicle 100 to return to the control center 172 for new programming. In addition, is any communication line to the autonomous vehicle 100 fails or is unavailable, the autonomous decision-making ability by the autonomous vehicle 100 becomes more valuable.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. An autonomous vehicle, comprising:
   a communication interface for receiving instructions to perform a first task in an environment using a first strategy, wherein the first task has a priority setting;
   one or more sensors for detecting one or more conditions in the environment to carry out the first task using the first strategy;
   data storage storing a plurality of task interruption scenarios each having an associated priority setting, and storing executable instructions for autonomous decision-making; and
   one or more processors for executing the instructions for autonomous decision-making stored in the data storage to perform functions comprising:
      during performance of the first task, identifying that the one or more conditions in the environment detected by the one or more sensors is associated with one of the plurality of task interruption scenarios;
      determining that the identified task interruption scenario is associated with a second task that has a higher priority setting than the first task;
      determining one or more assets needed to perform the second task; and
      based on the autonomous vehicle having the one or more assets needed to perform the second task, autonomously (i) stopping performance of the first task and (ii) changing to perform the second task in the environment.

2. The autonomous vehicle of claim 1, wherein the one or more processors further execute the instructions for autonomous decision-making stored in the data storage to send, via the communication interface, a notification to a control center informing of the identified condition based on the autonomous vehicle not having the one or more assets needed to perform the second task.

3. The autonomous vehicle of claim 1, wherein the one or more processors further execute the instructions for autonomous decision-making stored in the data storage to assign, via the communication interface, performance of the second task to another autonomous vehicle that has the one or more assets needed to perform the second task based on the autonomous vehicle not having the one or more assets needed to perform the second task.

4. The autonomous vehicle of claim 1, wherein the one or more processors further execute the instructions for autonomous decision-making stored in the data storage to reassign, via the communication interface, performance of the first task to another autonomous vehicle that has one or more assets needed to perform the first task.

5. The autonomous vehicle of claim 1, wherein the one or more processors execute the instructions for autonomous decision-making stored in the data storage to perform functions in real-time during performance of the first task.

6. The autonomous vehicle of claim 1, wherein the one or more processors further execute the instructions for autonomous decision-making stored in the data storage to access the data storage to identify the priority setting associated with the identified task interruption scenario.

7. The autonomous vehicle of claim 1, wherein the data storage further stores prioritized targets, and the first task is associated with a search for a first target having the priority setting, and wherein the one or more processors further execute the instructions for autonomous decision-making stored in the data storage to:
  access the data storage to determine that the one or more conditions in the environment detected by the one or more sensors includes one of the prioritized targets; and
  determine that the one of the prioritized targets has the higher priority setting than the first task.

8. The autonomous vehicle of claim 1, wherein the data storage further stores prioritized targets, and wherein the one or more sensors include both a visual camera and an infrared camera and wherein the one or more processors further execute the instructions for autonomous decision-making stored in the data storage to:
  process images or video streaming imagery captured by the camera to identify one of the stored prioritized targets.

9. The autonomous vehicle of claim 1, wherein the data storage further stores prioritized targets, and wherein the one or more sensors include a biosensor, and wherein the one or more processors further execute the instructions for autonomous decision-making stored in the data storage to:
  process outputs of the biosensor to identify a biological or chemical substance associated with one of the stored prioritized targets.

10. The autonomous vehicle of claim 1, wherein the data storage further stores prioritized targets, and wherein the one or more sensors include a radiation-sensor, and wherein the one or more processors further execute the instructions for autonomous decision-making stored in the data storage to:
  process outputs of the radiation-sensor to identify a radiation level associated with one of the stored prioritized targets.

11. The autonomous vehicle of claim 1, wherein the data storage further stores prioritized targets, and wherein the one or more sensors include an auditory-sensor, and wherein the one or more processors further execute the instructions for autonomous decision-making stored in the data storage to:
  process outputs of the auditory-sensor to identify an auditory signature or level associated with one of the stored prioritized targets.

12. A method for autonomous re-tasking of an autonomous vehicle, comprising:
  receiving instructions, at an autonomous vehicle, to perform a first task in an environment using a first strategy and using one or more sensors of the autonomous vehicle to carry out the first task using the first strategy, wherein the first task has a priority setting;
  during performance of the first task, the autonomous vehicle identifying a condition in the environment being associated with a task interruption scenario, based on outputs from the one or more sensors;
  determining, by the autonomous vehicle, that the task interruption scenario is associated with a second task that has a higher priority setting than the first task;
  determining, by the autonomous vehicle, one or more assets needed to perform the second task; and
  based on the autonomous vehicle having the one or more assets needed to perform the second task, the autonomous vehicle autonomously (i) stopping performance of the first task and (ii) changing to perform the second task in the environment.

13. The method of claim 12, wherein the autonomous vehicle autonomously (i) stopping performance of the first task and (ii) changing to perform the second task in the environment occurs in real-time during performance of the first task.

14. The method of claim 12, wherein the first task includes searching the environment for a target, and the first strategy includes a search pattern.

15. The method of claim 12, wherein the autonomous vehicle includes one or more processors and data storage storing a plurality of task interruption scenarios each having an associated priority setting, and wherein determining, by the autonomous vehicle, that the task interruption scenario is associated with the second task that has the higher priority setting than the first task comprises:
  the one or more processors accessing the data storage to identify the priority setting associated with the task interruption scenario.

16. The method of claim 12, wherein the autonomous vehicle includes a data storage storing prioritized targets, and the first task is associated with a search for a first target having the priority setting, and wherein determining, by the autonomous vehicle, that the task interruption scenario is associated with the second task that has a higher priority setting than the first task comprises:
  accessing the data storage to determine that the condition in the environment includes one of the prioritized targets; and
  determining that the one of the prioritized targets has the higher priority setting than the first task.

17. The method of claim 12, wherein the autonomous vehicle includes a data storage storing prioritized targets, and wherein the one or more sensors include both a visual camera and an infrared camera, and wherein identifying the condition in the environment being associated with the task interruption scenario comprises:
  processing images or video streaming imagery captured by the camera to identify one of the stored prioritized targets.

18. The method of claim 12, wherein the autonomous vehicle includes a data storage storing prioritized targets, and wherein the one or more sensors include a biosensor, and wherein identifying the condition in the environment being associated with the task interruption scenario comprises:
  processing outputs of the biosensor to identify a biological or chemical substance associated with one of the stored prioritized targets.

19. The method of claim 12, wherein the autonomous vehicle includes a data storage storing prioritized targets, and wherein the one or more sensors include a radiation-sensor, and wherein identifying the condition in the environment being associated with the task interruption scenario comprises:

processing outputs of the radiation-sensor to identify a radiation level associated with one of the stored prioritized targets.

20. The method of claim 12, wherein the autonomous vehicle includes a data storage storing prioritized targets, and wherein the one or more sensors include an auditory-sensor, and wherein identifying the condition in the environment being associated with the task interruption scenario comprises:

processing outputs of the auditory-sensor to identify an auditory signature or level associated with one of the stored prioritized targets.

21. The method of claim 12, further comprising based on the autonomous vehicle not having the one or more assets needed to perform the second task, the autonomous vehicle sending a notification to a control center informing of the identified condition.

22. The method of claim 12, further comprising based on the autonomous vehicle not having the one or more assets needed to perform the second task, the autonomous vehicle assigning performance of the second task to another autonomous vehicle that has the one or more assets needed to perform the second task.

23. The method of claim 12, further comprising the autonomous vehicle reassigning performance of the first task to another autonomous vehicle that has one or more assets needed to perform the first task.

24. The method of claim 12, further comprising the autonomous vehicle sending a notification to a control center informing of the autonomous vehicle changing to perform the second task in the environment.

\* \* \* \* \*